April 30, 1968   R. L. ARTER   3,380,716
ICE CREAM FREEZER SCRAPER BLADE
Filed Nov. 23, 1965
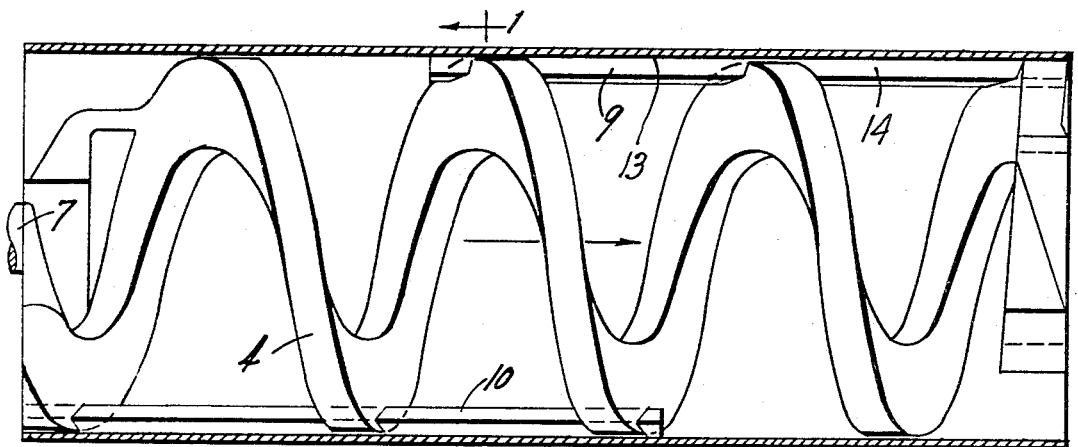
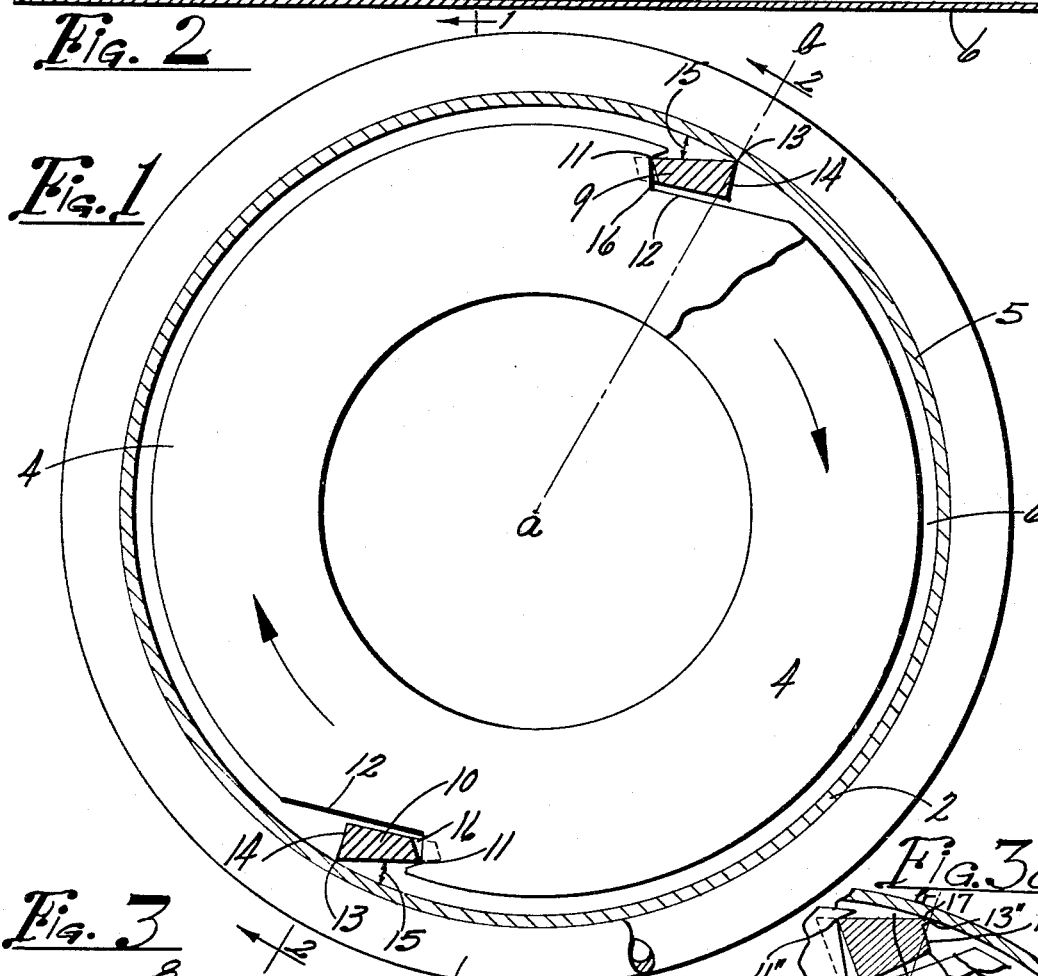
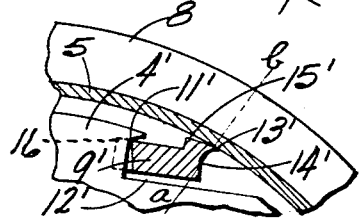
INVENTOR
ROBERT L. ARTER
ATTORNEY

United States Patent Office 3,380,716
Patented Apr. 30, 1968

3,380,716
ICE CREAM FREEZER SCRAPER BLADE
Robert L. Arter, Crestline, Ohio, assignor to Bakk Engineering, Cleveland, Ohio, a copartnership composed of Robert L. Arter, Charles A. Blum, John H. Kappus, and J. Harry Koplin
Filed Nov. 23, 1965, Ser. No. 509,281
3 Claims. (Cl. 259—9)

ABSTRACT OF THE DISCLOSURE

The scraping blade of this invention relies for good scraping pressure on the cylinder wall partly on centrifugal force and partly on the reaction of the ice cream on the front face of the scraping blade, which is inclined slightly forwardly from a radial plane. The blade shape and its pivotal mounting on the rotor are also important factors in its efficient scraping. It is of generally rectangular cross section, pivoted at the radially outer one of its trailing edges on the rotor and disposed at an acute angle of inclination relative to the cylinder wall with only its radially outer leading edge, which is defined by a substantially square corner of the blade section, in scraping contact with the inside of the cylinder, the scraping edge being defined at the radially outer end of a front face of the blade that is disposed in a plane inclined forwardly slightly relative to a plane disposed approximately radially relative to the cylinder. The leading scraping edge is in a substantially square corner portion of the blade section, may be defined on a forwardly extending radially outer portion of the blade section which is generally V-shaped for greater sharpness. Also, the front face of the blade may be given concave form behind the scraping edge.

---

This invention relates to improvements in ice cream freezers and is more particularly concerned with improvements in the blades on the rotary screw that serves both as a feeder and an agitator inside the freezer cylinder through which the ice cream mix flows horizontally from one end to the other to solve the problem of ice cream freezing onto the wall of the cylinder in the form of what the trade has come to know as a "doughnut." That occurs usually when the screw is stopped for a long enough interval between the serving of soft ice cream to customers, and this difficulty was due to wrong design of the scraper blades on the screw which, due to the fact that they were incapable of doing a really good job of scraping, allowed doughnuts of hard ice cream to form on the wall. Such formations results in (a) less efficient freezing; (b) considerable increased loading on the motor driving the screw, and, what is worse, (c) make the resulting "soft serve" product less homogeneous and smooth as desired. With my improved blades, designed to be forced outwardly against the cylinder wall and shaped so as not to be subject to excessive wear on the scraping edge, these difficulties previously experienced are eliminated and not only are there no further formations of doughnuts on the walls of the cylinder but the ice cream is always scraped clean from the wall and emerges as much smoother and more delectable high quality ice cream, making for much better satisfied customers, and there is faster freezing and less pull on the drive motor.

The invention is illustrated in the accompanying drawing, in which—

FIG. 1 is a cross-section taken on the line 1—1 of FIG. 2 showing a freezer cylinder the rotary screw in which is equipped with improved scraping blades in accordance with my invention;

FIG. 2 is a longitudinal section through the freezer cylinder taken on the line 2—2 of FIG. 1, and FIGS. 3 and 3a are fragmentary sections along the lines of FIG. 1 but showing two other blades of modified or alternative construction.

Similar reference numerals are applied to corresponding parts throughout these views.

Referring to the drawing and first to FIGS. 1 and 2, the reference numeral 4 designates a rotary open-center screw operating inside the freezer cylinder 5 with appreciable operating clearance, as indicated at 6 in FIG. 1, wherein the parts are shown substantially full size, the screw serving both as a feeder and an agitator in the cylinder, through which the ice cream mix flows horizontally from the left hand end in FIG. 2 to the right hand end, where it is discharged through an opening in the bottom portion of an end wall when the gate or valve closing the same is thrown open. Drive is transmitted in the usual way to the screw 4 at the left hand end indicated at 7 in FIG. 2. The cylinder 5 is enclosed by a refrigerating coil 8 through which the brine or other cooling medium is caused to flow in the usual way to refrigerate the ice cream mix to the degree common for "soft serve" ice cream. As previously indicated, there has been quite a problem with the ice cream adhering to the inside wall of the stainless steel cylinder 5 and forming a "doughnut," especially if the screw 4 happens to be stopped for a sufficient interval between servings of ice cream to customers. Evidently, this trouble arose through the failure of scraper blades on the screw to clear off the ice cream from the inside wall of the cylinder, and, where sharp edged blades were employed pivoted on a screw and set at a big enough angle relative to the wall of the cylinder to do a good scraping job, these had to be made of a softer metal than the stainless steel of the cylinder to avoid gouging and they failed, evidently because of prompt dulling of the working edges, so the doughnut of hard ice cream still formed around the inside wall, with three bad results:

(1) Reduced efficiency of freezing;
(2) Overloading of the drive motor, and
(3) Loss of smoothness and homogeneity of the soft serve ice cream, due to the easily noticeable hard frozen particles present in the outgoing ice cream and traceable to the breakup of the doughnut of hard ice cream.

In accordance with my invention, two longitudinally extending long narrow blades 9 and 10 are disposed in diametrically opposed relationship fulcrummed at their trailing edges 11 in diametrically opposed notches 12 provided in the periphery of the screw 4 while their leading edges 13 are in scraping contact with the inside surface of the cylinder 5 to scrape the same clear of ice cream, the one blade 9 working on the front approximately half length of the cylinder and the other blade 10 working on the back approximately half of the cylinder, with their adjoining end portions in over-lapping relation to the extent illustrated in FIG. 2, so that there is no portion of the cylinder wall left unscraped. The blades 9 and 10, which are of special dairy metal to give the desired long wear, are of trapezoidal or quadrilateral form in cross-section, as seen in FIG. 1, providing a front flat face 14 that is either on the radial line a–b or at a small acute angle of forward inclination relative to said radial line, as shown, so that ice cream abutting this front face 14 in the forward movement of the blades causes the blade to be forced outwardly into closer and cleaner scraping contact at 13 with the inside wall of the cylinder, and, due to the nearly 90° angle of the cross-section at the leading and scraping edge 13, there is no likelihood of the scraping edge having excessive wear and becoming dulled. The small angle 15 of inclination of the blades 9 and 10 relative to the inside wall of the cylinder is also considered quite important as this is closer to a snow shovel angle of inclination with respect to a sidewalk than was ever heretofore employed, to my knowledge. The inclination of the front face 14 is opposite to what was heretofore employed on the other scraping blades previously referred to, which were not successful. The blades 9 and 10 are both notched on the rear or trailing edge at longitudinally spaced points, as indicated in FIG. 1 at 16, in register with the notches 12 in the screw 4 to prevent endwise movement of the blades relative to the screw.

In operation, the scraping blades 9 and 10 of trapezoidal form and cross-section rely partly on centrifugal force to cause their leading and scraping edges 13 to be urged outwardly into scraping contact with the cylinder wall, but also on the realationship of their radially or nearly radially disposed front faces 14 to their fulcrums 11, which makes the ice cream abutting the front faces of these blades cause outward pressure on the blades against the cylinder wall, to do such a good clean scraping job on the inside of the cylinder 5 that there are never any doughnut formations of ice cream in the cylinder and the soft serve ice cream always emerges as much smoother and more delectable ice cream than was obtainable with earlier constructions. Heretofore, as indicated before, there was too much reliance upon sharpness of the knife edges but these edges were too easily dulled in service, with the result that the scraping blades failed to scrape the surface clean and, once a coating of frozen ice cream began to form, the blades being dull, slid over the coating and allowed it to build up readily to doughnut size when the screw was stopped for even a short interval between servings of ice cream to customers. With my construction, there is no perceptible change in the sharpness of the edges 13 and the blades perform well indefinitely. The two blades 9 and 10 are interchangeable, being of equal length and weight, and therefore, the screw 4 is well balanced and operates with minimum vibration.

In FIG. 3 I have shown a modified or alternative construction wherein the blade 9', which, of course, will have a companion blade 10' of similar form and interchangeable therewith operating in diametrically opposed relationship thereto, similarly as in FIGS. 1 and 2, is of polygonal form in cross-section, fulcrummed at its trailing edge 11' in the notch 12' in the periphery of the screw 4' and has its relatively sharp leading edge 13' defined by the hollow ground or concave front face 14' of the blade disposed either on the radial plane $a$–$b$ or inclined forwardly relative thereto, this formation of the blade enabling reduction in the angle 15' to a small fraction of the already small angle 15 shown in the first form, with a view to obtaining an improved close shaving action in scraping along the inside of the cylinder 5, while still retaining the novel effect of the ice cream abutting the front face causing outward pressure on the blade to give a closer and cleaner scraping action.

In FIG. 3a, I have shown another blade 9" of modified or alternative construction similar to blade 9', which, of course, will have a companion blade 10" of similar form and interchangeable therewith operating in diametrically opposed relationship thereto, similarly as in FIGS. 1 and 2, is of polygonal form in cross-section, fulcrummed at its trailing edge 11" in the notch 12" in the periphery of the screw 4" and has its leading edge 13" defined on the apex of a triangular edge portion 17 projecting forwardly from the otherwise flat front face 14" of the blade disposed either on the radial plane $a$–$b$ or inclined forwardly relative thereto, the blade being disposed at approximately the same small angle relative to the wall of the cylinder 5 and retaining the novel effect of the ice cream abutting the front face causing outward pressure on the blade to give a closer and cleaner scraping action. This blade form gives longer wear than that of FIG. 3 but the operation of both is otherwise substantially the same.

It is believed the foregoing description conveys a good understanding of the objects and advantages of my invention. The appended claims have been drawn to cover all legitimate modifications and adaptations.

I claim:

1. In an ice cream dispensing freezer comprising a horizontal freezing cylinder through which ice cream mix is adapted to flow from one end to a valved discharge opening at the other end, and a helical rotor serving as a feeder and agitator disposed inside said cylinder extending axially thereof substantially its full length and operating with appreciable radial clearance with respect to the inside wall of said cylinder, said rotor having drive transmitted thereto at one end, the improvement comprising an elongated narrow rigid scraper blade mounted parallel to the center line of said cylinder on said rotor in longitudinally aligned recesses provided therefor in the periphery thereof, the blade being of generally rectangular cross-section pivoted at the radially outer one of its trailing edges on said rotor and disposed at an acute angle of inclination relative to the cylinder wall with only its radially outer leading edge which is defined by a substantially square corner of the blade section, in scraping contact with the inside of the cylinder, the scraping edge being defined at the radially outer end of a front face of the blade that is disposed in a plane inclined slightly forwardly relative to a plane disposed approximately radially relative to the cylinder, said blade being urged outwardly partly by centrifugal force into scraping contact with the cylinder wall and partly by the reaction of the forwardly inclined front face of the blade on the ice cream scraped off said wall by said blade.

2. An ice cream dispensing freezer as set forth in claim 1 wherein said blade has its front face of concave form so as to define the leading scraping edge in the one corner of the section on the apex of a forwardly extending radially outer portion of the blade section which is of generally V-shaped section for greater sharpness.

3. An ice cream dispensing freezer as set forth in claim 1, wherein said blade has its leading scraping edge in the one corner of the section on the apex of a forwardly extending radially outer portion of the blade section which is of generally V-shaped section for greater sharpness.

References Cited

UNITED STATES PATENTS

| | | | |
|---|---|---|---|
| 2,535,462 | 12/1950 | Stoelting et al. | 259—1 |
| 2,645,911 | 7/1953 | Martin | 259—1 |
| 2,713,474 | 7/1955 | Read | 259—1 |
| 3,061,281 | 10/1962 | Phelan et al. | 259—1 |
| 3,087,708 | 4/1963 | Sims | 259—1 |

WILLIAM I. PRICE, *Primary Examiner.*

J. M. BELL, *Assistant Examiner.*